US007592279B1

(12) United States Patent
Speyer et al.

(10) Patent No.: US 7,592,279 B1
(45) Date of Patent: Sep. 22, 2009

(54) BORON CARBIDE AND BORON CARBIDE COMPONENTS

(75) Inventors: Robert F. Speyer, Atlanta, GA (US); Hyukjae Lee, Miamisburg, OH (US); Zhihao Bao, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 10/867,442

(22) Filed: Jun. 14, 2004

Related U.S. Application Data

(60) Provisional application No. 60/478,045, filed on Jun. 12, 2003.

(51) Int. Cl.
C04B 35/563 (2006.01)
(52) U.S. Cl. ........................................ 501/87; 89/36.02
(58) Field of Classification Search .................... 501/87; 89/36.02
See application file for complete search history.

(56) References Cited

U.S. PATENT DOCUMENTS

| | | | | |
|---|---|---|---|---|
| 2,027,786 A | | 1/1936 | Ridgway et al. ............... 13/23 |
| 3,914,371 A | * | 10/1975 | Benton et al. ............... 264/332 |
| 4,005,235 A | | 1/1977 | Prochazka .................... 428/36 |
| 4,104,062 A | | 8/1978 | Weaver ......................... 75/238 |
| 4,195,066 A | * | 3/1980 | Schwetz et al. ............. 423/291 |
| 4,495,123 A | | 1/1985 | Hunold et al. ................. 264/69 |
| 4,524,138 A | * | 6/1985 | Schwetz et al. ............... 501/90 |
| 4,704,250 A | | 11/1987 | Cline et al. .................... 419/15 |
| 4,804,525 A | | 2/1989 | Rafaniello et al. .......... 423/291 |
| 4,879,165 A | | 11/1989 | Smith .......................... 428/212 |
| 4,946,808 A | | 8/1990 | Wei et al. ...................... 501/95 |
| 4,980,104 A | | 12/1990 | Kawasaki .................... 264/65 |
| 5,010,043 A | | 4/1991 | Ringwood .................... 501/90 |
| 5,089,197 A | | 2/1992 | Butler et al. ................... 264/65 |
| 5,182,059 A | | 1/1993 | Kawasaki et al. ............. 264/65 |
| 5,312,788 A | | 5/1994 | Li et al. |
| 5,348,694 A | | 9/1994 | Goldberger ................... 264/27 |
| 5,505,899 A | | 4/1996 | Sigl et al. .................... 264/297 |
| 5,523,268 A | | 6/1996 | Ukyo et al. .................... 501/92 |
| 5,543,370 A | | 8/1996 | Sigl et al. ...................... 501/92 |
| 5,545,687 A | * | 8/1996 | Burns et al. ................. 264/625 |
| 5,720,910 A | | 2/1998 | Vlajic et al. ............... 264/29.1 |
| 5,720,911 A | * | 2/1998 | Taylor et al. .............. 264/29.1 |
| 6,001,304 A | | 12/1999 | Yoo et al. ...................... 419/10 |
| 6,203,908 B1 | | 3/2001 | Cohen .......................... 428/397 |
| 6,258,741 B1 | * | 7/2001 | Kohsaka et al. ............... 501/87 |
| 6,315,945 B1 | | 11/2001 | Macki et al. ................... 419/5 |
| 6,500,507 B1 | | 12/2002 | Fisher |
| 6,613,462 B2 | | 9/2003 | Macki et al. ................. 428/698 |
| 6,699,450 B2 | | 3/2004 | Dunn et al. .................. 423/291 |
| 6,807,891 B2 | | 10/2004 | Fisher |
| 6,855,428 B2 | | 2/2005 | Lau et al. ..................... 428/408 |
| 2002/0005085 A1 | | 1/2002 | Macki et al. |
| 2004/0065868 A1 | | 4/2004 | Aghajanian et al. |
| 2004/0083880 A1 | | 5/2004 | Cohen |
| 2004/0208772 A1 | | 10/2004 | Eiberger et al. |

FOREIGN PATENT DOCUMENTS

| | | | |
|---|---|---|---|
| EP | 0239789 | * | 7/1987 |
| JP | 59-162180 | * | 9/1984 |
| JP | 62-153166 | * | 7/1987 |
| JP | 62-207762 | | 9/1987 |
| JP | 63-156068 | | 6/1988 |
| JP | 10-106875 | | 4/1998 |
| JP | 2000-154062 | * | 6/2000 |
| JP | 2001-122665 | | 5/2001 |
| WO | WO 00/68165 | | 11/2000 |

OTHER PUBLICATIONS

Sintering of Boron Carbide Heat-Treated with Hydrogen—Lee & Speyer—School of Materials Science and Engineering, Georgia Institute of Technology, Atlanta, GA, Aug. 2000.
Density- and Hardness-Optimized Pressureless Sintered and Post-Hot Isostatic Pressed $B_4C$—Cho, Bao and Speyer—School of Materials Science and Engineering, Georgia Institute of Technology, Atlanta Georgia, Apr. 2005.
Boron Carbide—A Comprehensive Review—Francois Thevenot—Ecole Nationale Superieure des Minse de Saint-Etienne, France, 1990.
Aqueous Dispersion and Slip Casting of Boron Carbide Powder: Effect of pH and Oxygen Content—Williams & Hawn—Advanced Ceramics Laboratory and Analytical Sciences Laboratory—The Dow Chemical Company, Midland, Michigan, 1991.
Pressureless Sintering of Boron Carbide—Lee & Speyer—School of Materials Science and Engineering, Georgia Institute of Technology, Atlanta, GA, 2003.
Hot Isostatic Pressing—Larker—ABB Cerama AB, Robertsfors, Sweden.
Low-Cost Processing of Dense and Complex Products—Larker, Adlerborn and Karlsson—ABB Cerama AB—Robertsfors, Sweden, 1993.
Office Action issued by the Japanese Patent Office on Jan. 6, 2009 in connection with corresponding Japanese Patent Application No. 2006-533778.
Translation of the Office Action issued by the Japanese Patent Office on Jan. 6, 2009 in connection with corresponding Japanese Patent Application No. 2006-533778.
Edited by Onoda, Jr. and Hench; Ceramic Processing Before Firing; The Rheology of Organic Binder Solutions; pp. 249-251.
Nihara, et al.; The Effect of Stoichiometry on Mechanical Properties of Boron Carbide; Communications of the American Ceramic Society; Jan. 1984; pp. C-13-C-14.

(Continued)

*Primary Examiner*—Karl E Group
(74) *Attorney, Agent, or Firm*—Ostrolenk Faber LLP

(57) ABSTRACT

High-density components and products as well as processes for making high-density components and products are disclosed. One exemplary component, among others, includes a boron carbide component comprised of a homogeneous boron carbide powder. The component has at least a 93% relative density (RD) and a Vickers hardness of at least 2000 $kg/mm^2$.

13 Claims, 3 Drawing Sheets

OTHER PUBLICATIONS

Lee, et al.; Hardness and Fracture Toughness of Pressureless-Sintered Boron Carbide ($B_4C$); J. Am. Ceram. Soc. 85 [5]; 2002; pp. 1291-1293.

Francois Thévenot; Boron Carbide—A Comprehensive Review; Journal of the European Ceramic Society; 1990; 6; pp. 205-225.

Lee, et al.; Sintering of Boron Carbide Heat-Treated With Hydrogen; J. Am. Ceram. Soc.; 2002; 85 [8]; pp. 2131-2133.

Lee, et al.; Pressureless Sintering of Boron Carbide; J. Am. Ceram. Soc.; 2003; 86 [9]; pp. 1468-1473.

Characteristics and Properties of Silicon Carbide and Boron Carbide; Handbook of Refractory Carbides and Nitrides; pp. 137-155.

Frage, et al.; The effect of the sintering atmosphere on the densification of B4C ceramics; Journal of Solid State Chemistry; 2003; pp. 1-5.

de Melo, et al.; Composition Effects on the Microstructure and Mechanical Properties of Sintered Boron Carbide; Materials Science Forum; vols. 299-300; 1999; pp. 13-18.

Kalandadze, et al.; Sintering of Boron and Boron Carbide; Journal of Solid State Chemistry; 2000; 154; pp. 194-198.

Williams; Aqueous Dispersion and Slip Casting of Boron Carbide Powder: Effect of pH and Oxygen Content; J. Am. Ceram. Soc.; 1991; 74 [7]; pp. 1614-1618.

Bouchacourt; et al.; The Properties and Structure of the Boron Carbide Phase; Journal of the Less-Common Metals; 1981; vol. 82; pp. 227-235.

Larsson, et al.; Improvements of the microstructure and erosion resistance of boron carbide with additivies; Journal of Materials Science; 2000; vol. 35; pp. 3433-3440.

Champagne, et al.; Mechanical Properties of Hot-Pressed B-B4C Materials; 1977; 4 pages.

* cited by examiner

BORON CARBIDE AND BORON CARBIDE COMPONENTS

CROSS-REFERENCE TO RELATED APPLICATION

This application claims priority to U.S. provisional application entitled, "Pressureless Sintering of Boron Carbide" having Ser. No. 60/478,045, filed on Jun. 12, 2003, and which is entirely incorporated herein by reference.

TECHNICAL FIELD

This disclosure is generally related to boron carbide, and more particularly, this disclosure is related to method of making high density products and products made of boron carbide.

BACKGROUND

Boron carbide ($B_4C$) is a covalently-bonded solid with a high melting point (2427° C.), an extremely high hardness (Vickers hardness: 2400 kg/mm$^2$), a low density (2.52 g/cm$^3$) and a high neutron absorption cross-section. It is a solid solution with carbon in the range 8.8-20.0 mol %. Boron carbide has been used for light-weight ceramic armor, for wear-resistant components such as blasting nozzles and grinding wheels, and for control rods in nuclear reactors Sintering of pure boron carbide to high densities has proven difficult. Specific additives (sintering aids such as carbon, $Al_2O_3$ and $TiB_2$) or hot pressing have been used to achieve near full density. $B_4C$ powders are typically hot-pressed at about 2100° C. and under 30-40 MPa uniaxial pressure to obtain dense articles.

SUMMARY

High-density components and products and processes for making high-density components and products are disclosed. One exemplary process, among others, includes: providing a boron carbide powder having at least a 60% relative green density (RD) and not including a sintering additive; shaping the boron carbide powder into a component; heating a furnace to about 1100 to 1400° C. for about 30 to 120 minutes (min), wherein the furnace includes the structure, and wherein the furnace includes a $H_2$/He gas mixture; purging the furnace for about 120 to 480 min in a vacuum at a temperature from about 1100 to 1400° C.; substantially sintering the component by pressureless sintering without sintering additives by heating the furnace to about 2300 to 2400° C. at about 50 to 150° C./min; and forming a sintered component having at least a 93% RD and a Vickers hardness of about at least 2000 kg/mm$^2$.

One exemplary component, among others, includes a boron carbide component comprised of a homogeneous boron carbide powder. The component has at least a 93% relative green density (RD) and a Vickers hardness of at least 2000 kg/mm$^2$.

Other processes, components, products, methods, features, and advantages of this disclosure will be or become apparent to one with skill in the art upon examination of the following drawings and detailed description. It is intended that all such additional methods, features, and advantages be included within this description, be within the scope of this disclosure, and be protected by the accompanying claims.

BRIEF DESCRIPTION OF THE DRAWINGS

Many aspects of this disclosure can be better understood with reference to the following drawings.

DETAILED DESCRIPTION

Figure 1:
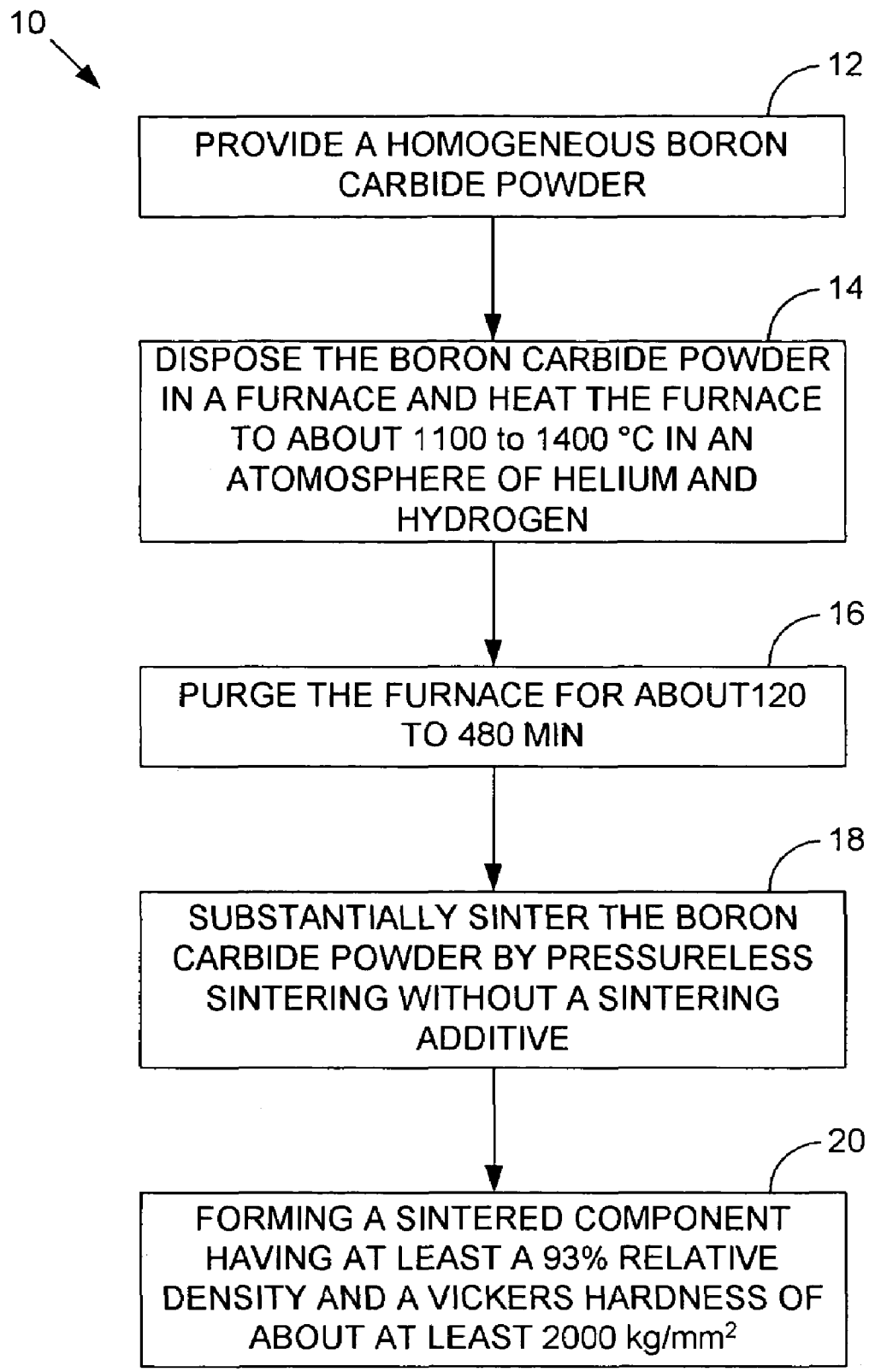
FIG. 1 is a flowchart depicting functionality of an embodiment of a process for making components made of boron carbide powder.

Processes and methods of making boron carbide compositions (powders) and components made from boron carbide powders are described herein. In general, processes for the pressureless sintering of homogeneous boron carbide powders, without the addition of sintering additives, to produce components having relative densities (RDs) greater than 93% and Vickers hardness of greater than 2000 kg/mm$^2$ are described. In addition, pressureless-sintered components (hereinafter "sintered components") can be further processed by hot isostatic pressing the sintered component to produce hot isostatic pressed components (hereinafter "HIP" components) having RDs greater than 93% and Vickers hardness of greater than 2000 kg/mm$^2$. In some embodiments the HIP components have RDs greater than 99% and Vickers hardness of greater than 2500 kg/mm$^2$. The formed components (e.g., sintered components and HIP components) range from simple substantially planar plates (e.g., ballistic armor plates for military and police ground, air, and marine vehicles) to complex contoured structures (e.g., monolithic structures contoured to the form of the human body, such as helmets contoured to a human's head).

The boron carbide powder ($B_4C$ solid solution) is processed using a pressureless sintering system (H. Lee and R. F. Speyer, "Hardness and Fracture Toughness of Pressureless-sintered $B_4C$," J. Am. Ceram. Soc., 85 [5] 1291-93 (2002); H. Lee, W. S. Hackenberger, and R. F. Speyer, "Sintering of Boron Carbide Heat-treated with Hydrogen," J. Am. Ceram. Soc., 85 [8] 2131-33 (2002); H. Lee and R. F. Speyer, "Pressureless Sintering of Boron Carbide," J. Am. Ceram. Soc., 86 [9] 1468-73 (2003), each of which are incorporated herein by reference). The boron carbide powder is homogenous powder (e.g., without sintering additives). The boron carbide powder is pressed or cast into a compact high-green density component. The compact high-green density component is placed (disposed) into a furnace of the pressureless sintering system and the furnace is heated to a temperature in the range of about 1100 to 1400° C. in a $H_2$/He gas mixture for about 30 to 120 minutes. Next, the furnace is purged for about 120 to 240 minutes to substantially remove residual $H_2$ in a vacuum or in a He atmosphere. Subsequently, the boron carbide powder is sintered by pressureless sintering without a sintering additive at about 2300 to 2400° C., at a heating rate of 100° C./minute. Although not intending to be bound by theory, the rate of heating is set to avoid concurrent particle coarsening in the temperature range from about 2000 to 2150° C., which would otherwise reduce the driving force for sintering. The sintered component has at least a 93% RD and Vickers hardness of greater than 2000 kg/mm$^2$.

The sintered component can be further treated using hot isostatic pressing (e.g., at 2150° C. for about 125 minutes at 310 MPa of Argon) to produce hot isostatic pressed structures having RDs greater than 93% and Vickers hardness of greater than 2000 kg/mm$^2$, and typically produce structures having RDs greater than 99% and Vickers hardness of greater than 2500 kg/mm$^2$. Hot isostatic pressing has been discussed in the following references: H. V. Atkinson and B. A. Rickinson, *Hot Isostatic Processing*, A. Hilger, Bristol, England, 1991; R. J. Schaefer and M. Linzer, Hot Isostatic Pressing: Theory and Applications, ASM International, Materials Park, Pa., 1991, each of which are incorporated herein by reference. It should be noted that hot isostatic pressing is effective at increasing the relative density of components having closed porosity (e.g., sintered components having at least about a 93% RD).

In general, the component (e.g., sintered component and/or the hot isostatic pressed product) can be formed using conventional ceramic forming techniques. In this regard, the component and/or product formed are only limited by the ceramic forming technique. Therefore, other components and/or products that can be formed using ceramic forming techniques are included within this disclosure.

The components can be monolithic or multiple components can be used to form a composite product, where multiple distinct components form a composite product. The component can be used in conjunction with other components or coated with other compounds or materials to add or enhance one or more characteristics of the final monolithic or composite product.

The components can be simple shapes (e.g., polygons, circles, and unsymmetrical shapes) of various constant or varying dimensions (e.g., length, width, and thickness). In addition, embodiments of this disclosure provide processes and methods of forming components having complex shapes and/or two- and three-dimensional structures (e.g., complex monolithic components or composite products) having constant or varying dimensions.

For example, the component can include, but is not limited to, a substantially flat component, a substantially curved component, a component having a plurality of curves, a concave component, a convex component, a honeycomb component, a component with one or more voids therein, and combinations thereof. These types of components may be used as armor (e.g., monolithic component and/or composite products) for ground, air, and marine vehicles, in particular military or police vehicles. In addition, these components can be used as body armor or in shields (e.g., monolithic and/or composite structures). In some embodiments, it is advantageous to have armor covering large portions of the body (e.g., head and chest) that is monolithic to limit weak points in the armor.

In another example, the component can be complex having a plurality of curves, dimension, contours, structural features (e.g., lips, flares, securing mechanisms, etc.) and the like. For example, the component can be contoured to the form of various areas of the human body (e.g., head, torso, back, groin, arms, legs, shoulders, hips, etc.) and used as monolithic armor (e.g., helmet, torso, shoulder, etc.) or in composite armor (e.g., vest). In particular, the component can be contoured to the shape of a human's head, shoulder, torso, etc. Furthermore, the component can be contoured to a specific human's contour (e.g., male/female, small/large body frame, etc.).

In addition, the component can include, but is not limited to, components needing high-density qualities, high hardness qualities, high impact resistant qualities, high abrasive qualities, high wear resistant qualities, nuclear absorption qualities, light weight qualities, and combinations thereof. The component can include, but is not limited to, bearings, gears, sandblasting nozzles, water-blasting nozzles, nuclear parts (e.g., rods), blades, and the like. In addition, the component can be used as structural and/or functional components on land, air, and marine vehicles rather than simply armor affixed to vehicles.

FIG. 1 is a flowchart depicting functionality of an embodiment of a process 10 for making sintered components. As shown in FIG. 1, the process may be construed as beginning at block 12, where a homogeneous boron carbide powder is provided. The homogeneous boron carbide powder does not include sintering additives, which may have detrimental affects on one or more properties of the sintered structure to be formed. The boron carbide powder is pressed into a green boron carbide compact having at least about a 60% RD. In block 14, the boron carbide composition can be placed (disposed) into a heating furnace. Prior to or in the heating furnace the boron carbide powder can be formed into the appropriate component using conventional ceramic techniques (J. S. Reed, *Principles of Ceramic Processing*, 2$^{nd}$ Ed., John Wiley and Sons, Inc., New York, 1995; G. Y. Onoda, Jr., and L. L. Hench, *Ceramic Processing Before Firing*, John Wiley and Sons, New York, 1978; T. A. Ring, *Fundamentals of Ceramic Processing*, Academic Press, San Diego, Calif., 1996, each of which are incorporated herein by reference). The heating furnace is a part of a pressureless sintering system. The furnace heats to about 1100 to 1400° C., 1150 to 1300° C., or about 1200° C. The boron carbide powder is held at this temperature for about 30 to 400 minutes (min), 30 to 120 min, or about 30 min. In addition, the furnace includes a H$_2$/He gas mixture (a flowing mixture) at a pressure of about 760 Torr. The ratio of the H$_2$/He gas mixture is about 10 to 90 or 40 to 60.

In block 16, the furnace including the component is purged of H$_2$ for about 120 to 480 min, 120 to 240 min, or 120 min. The purging process is conducted at a temperature from about 1100 to 1400° C., 1150 to 1300° C., and about 1200° C. In an embodiment, the furnace is purged in a vacuum of about 0.01 to 20 KPa, 0.01 to 10 KPa, and 10 KPa. In another embodiment, the furnace is purged in a flowing atmosphere of He at a pressure of about 760 Torr. It should be noted that the purging process should remove the residual H$_2$, so that one or more parameters (e.g., time) can be adjusted to sufficiently remove the H$_2$. In this regard, various H$_2$/He gas mixture ratios can be used in the heating process described in block 14 as long as the purging process is structured to remove a sufficient amount of H$_2$ to allow for appropriate RD and Vickers hardness to be achieved.

In block 18, the component is substantially sintered by pressureless sintering without the addition of sintering additives. The furnace is heated to about 2300 to 2400° C. (as measured by an infrared pyrometer) at a rate of about 50 to 150° C./min, 75 to 125° C./min and about 100° C./min. The pressure in the furnace is about 1 ATM (760 Torr) of flowing He. The component is soaked in the furnace for a time period until the shrinkage rate is less than about 0.05%/min (H. Lee and R. F. Speyer, "Pressureless Sintering of Boron Carbide," J. Am. Ceram Soc., 86 [9] 1468-73 (2003)). In block 20, a sintered structure having at least a 93% RD, at least a 94% RD, at least a 94.7% RD, at least a 95% RD, at least a 96% RD, at least a 96.6% RD, and at least a 97% RD, is formed. In addition, the sintered structure has a Vickers hardness of about at least 2000 kg/mm$^2$, at least 2200 kg/mm$^2$, at least 2250 kg/mm$^2$, at least 2300 kg/mm$^2$, and at least 2400 kg/mm$^2$, as measured by techniques described in H. Lee and R. F. Speyer, "Hardness and Fracture Toughness of Pressureless-sintered B$_4$C," J. Am. Ceram. Soc., 85 [5] 1291-93 (2002).

Figure 2:
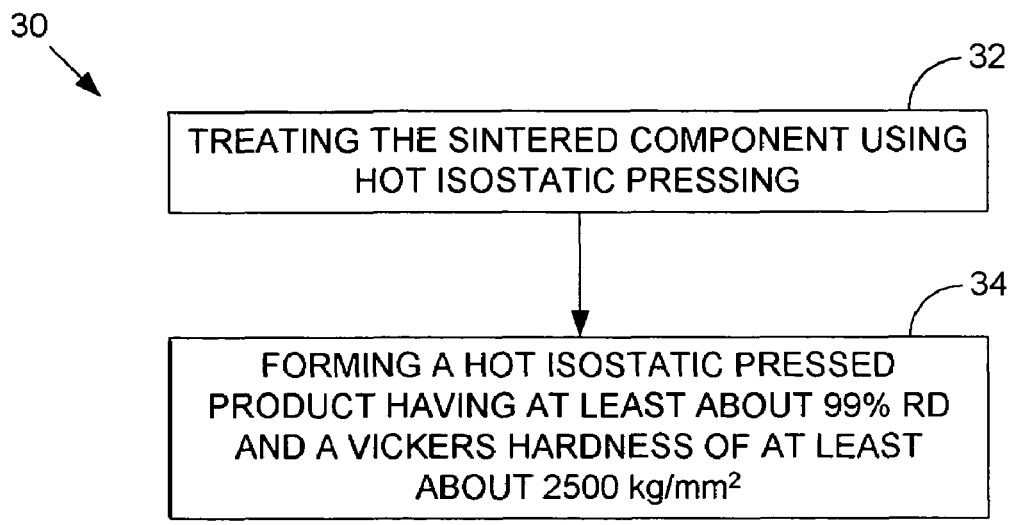
FIG. 2 is a flowchart depicting functionality of an embodiment of a process for treating sintered components of boron carbide powder using hot isostatic pressing systems.

FIG. 2 is a flowchart depicting functionality of an embodiment of a process 30 for treating sintered boron carbide structures using hot isostatic pressing systems. To be treated using hot isostatic pressing, the sintered structure needs to have at least a 93% RD, at least a 94% RD, at least a 95% RD, at least a 96% RD, and at least a 97% RD. It should be noted that the components that can be fabricated using the embodiments described above are not restricted by shape as in hot-pressing systems. Therefore, components with complex shapes can be treated in the hot isostatic pressing system. As shown in FIG. 2, the process may be construed as beginning at block 32, where the sintered structure is heat treated by hot isostatic pressing. In block 34, a hot isostatic pressed structure is formed having at least a 99% RD, at least a 99.1% RD, at least a 99.5% RD, at least a 99.6% RD, at least a 99.7% RD, and at least a 99.8% RD. The hot isostatic pressed structure has a Vickers hardness of at least about 2500 kg/mm$^2$ and a fracture toughness of at least about 3 MPa·m$^{1/2}$, at least 3.7 MPa·m$^{1/2}$, and at least 3.9 MPa·m$^{1/2}$ (based on the literature elastic modulus of 450 MPa).

Figure 3:
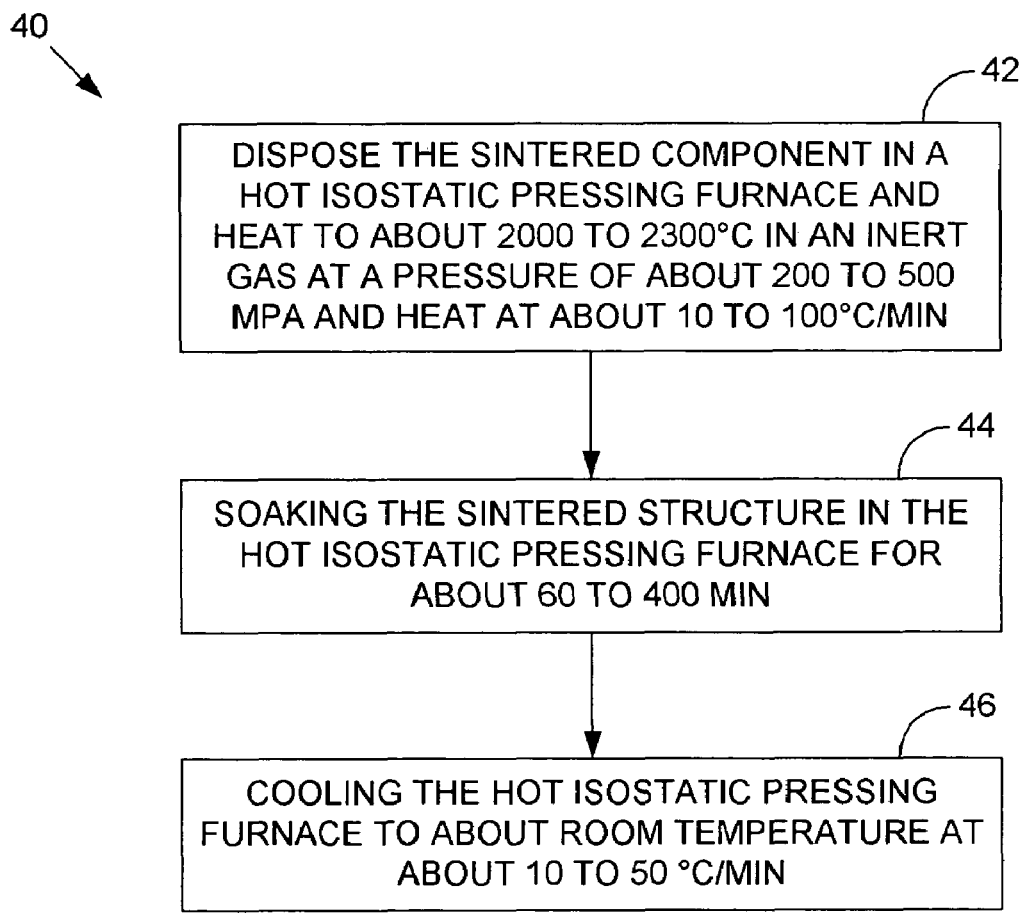
FIG. 3 is a flowchart depicting functionality of a specific embodiment of a process for treating sintered components using hot isostatic pressing systems.

FIG. 3 is a flowchart depicting functionality of a specific embodiment of a process 40 for treating sintered structures using hot isostatic pressing systems. As shown in FIG. 3, the process may be construed as beginning at block 42, where a hot isostatic pressing furnace is heated to about 2000 to 2300° C., about 2100 to 2200° C., and about 2150° C. in an inert gas (e.g., Ar and/or He gas) at a pressure of about 200 to 500 MPa, about 300 to 400 MPa, and about 310 MPa. The hot isostatic pressing furnace is heated at a rate of about 10 to 100° C./min, 15 to 50° C./min, and about 20° C./min. In block 44, the sintered structure is soaked in the hot isostatic pressing furnace for about 60 to 400 min, 60 to 240 min, and about 125 min. In block 46, the hot isostatic pressing furnace is cooled to about room temperature ° C. at about 10 to 50° C./min, about 15 to 30° C./min, and about 20° C./min. It should be noted that the cooling rate is restricted by the thermal shock resistance of the particular geometry of the component being manufactured (e.g., the cooling rate will be slower for larger HIP products).

EXAMPLES

Coarsening Mechanisms

Using a unique high-temperature differential dilatometer, the particle coarsening processes that compete with sintering were discerned (H. Lee, W. S. Hackenberger, and R. F. Speyer, "Sintering of Boron Carbide Heat-treated with Hydrogen," J. Am. Ceram. Soc., 85 [8] 2131-33 (2002); H. Lee and R. F. Speyer, "Pressureless Sintering of Boron Carbide," J. Am. Ceram. Soc., 86 [9] 1468-73 (2003)). Particle coarsening decreases the surface energy-based driving force for sintering, and results in lower achievable final densities.

Commercially available B$_4$C powders (Grade HS, H. C. Starck, Berlin, Germany) were used in the as-received state. Table I shows the characteristics of the powder based on the manufacturer's data. Powders were uniaxially pressed into compacts (about 5 mm in height and 6.4 mm in diameter) in a steel die at about 200 MPa.

TABLE 1

B$_4$C Powder Characteristics.

| | Impurity levels: |
|---|---|
| Surface area: 18.8 m$^2$/g | 1.500 wt % O |
| Particle size: | 0.410 wt % N |
| 90% of particles ≦ 2.99 μm | 0.022 wt % Fe |
| 50% of particles ≦ 0.84 μm | 0.055 wt % Si |
| 10% of particles ≦ 0.24 μm | 0.003 wt % Al |
| Total boron: 75.39 wt % | 0.230 wt % Other |
| Total carbon: 22.26 wt % | |
| B/C molar ratio: 3.76 | |

Figure 4:
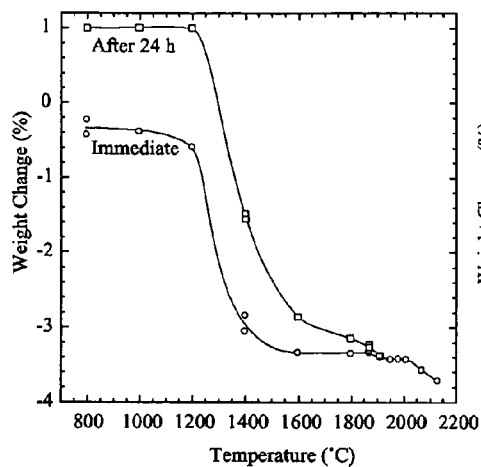
FIG. 4 is a graph illustrating the weight changes in $B_4C$ pressed pellets after heating to various temperatures at 50° C./min up to 1800° C., and 5° C./min above this temperature, under flowing He. Specimens were cooled in the furnace with the elements turned off under flowing He. Measurements were made immediately after removal from the furnace and again after exposure to room air for one day.

The presence of B$_2$O$_3$ coatings on B$_4$C particles is implied by FIG. 4. Compacts heated to temperatures up to about 1200° C. initially lost weight, but then regained more than this weight over time after hydration of the oxide coatings by room air (forming, for example, orthoboric acid, H$_3$BO$_3$). After heating between about 1200 and 1600° C., the vapor pressure of B$_2$O$_3$ became significant, whereby weight loss was substantial and permanent. Weight loss, which began again at temperatures exceeding about 2010° C., corresponded to volatilization of B$_4$C, or its molecular subunits.

Figure 5:
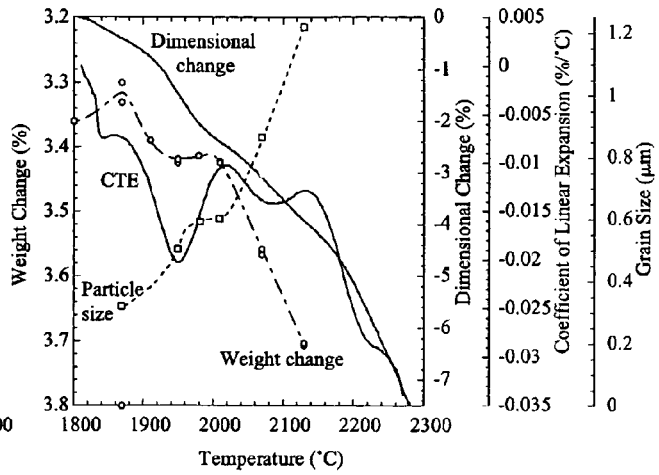
FIG. 5 is a graph illustrating the trends in shrinkage, coefficient of thermal expansion (CTE), particle/grain size and weight change of $B_4C$ samples after heating at 5° C./min up to specific maximum temperatures and then cooling with no soaking.
Figure 6:
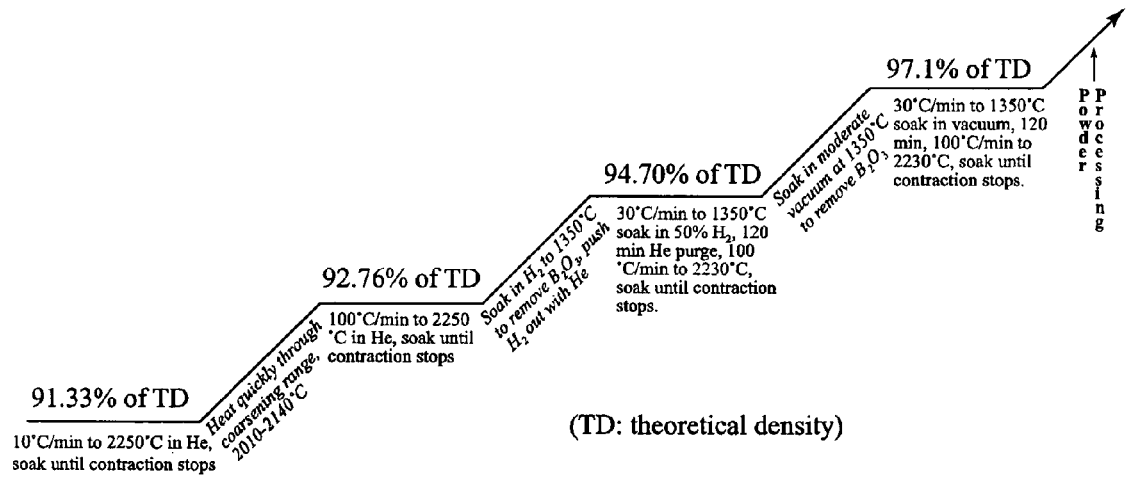
FIG. 6 is a schematic illustrating the progressive improvements in the fired density of pressed $B_4C$ compacts.

FIG. 5 illustrates the progression in densification, particle/grain size and weight loss for undoped specimens heated to specified temperatures, followed by furnace cooling. The vaporization of B$_2$O$_3$ coatings on the B$_4$C particles permitted direct B$_4$C—B$_4$C contact, and a surge in densification between 1870 and 2010° C. During the early portion of this temperature range (i.e., 1870-1950° C.) concurrent particle coarsening was attributed to evaporation and condensation (from small to large particles) of rapidly evolving oxide gases (e.g., BO and CO [S. L. Dole, S. Prochazka, and R. H. Doremus, "Microstructural Coarsening During Sintering of Boron Carbide," J. Am. Ceram. Soc., 72 [6] 958-66 (1989)]). Weight loss and particle/grain coarsening, stalled between about 1960 and 2010° C., and resumed thereafter. Coarsening and weight loss was then concurrent with slowed densification up to about 2140° C. This corresponds to evaporation and condensation of B$_4$C, a coarsening mechanism typical of such covalently-bonded solids [R. M German, Sintering Theory and Practice, John Wiley and Sons, New York, (1996)]. It is not clear whether the evaporated gaseous species were molecular B$_4$C, or fragments of this molecule.

Above about 2140° C., densification accelerated significantly. Impurity-induced grain boundary liquid may have formed at and above this temperature. More likely, non-stoichiometric volatilization of B$_4$C left C behind (as indicated by X-ray diffraction results), accelerating sintering via enhanced grain boundary diffusivity of boron and carbon activated sintering (R. M German, Sintering Theory and Practice, John Wiley and Sons, New York, (1996)), and inhibited grain growth, keeping diffusion distances relatively short.

Methods Developed for Attenuation of Coarsening Processes

Under rapid heating through the range of about 1870-1950° C., the extraction rate of B$_2$O$_3$ was accelerated, leaving less time for oxide-facilitated particle coarsening to take place, and through the range of about 2010-2140° C., minimized the time over which coarsening could occur by evaporation and condensation of B$_4$C. Rapid heating brought comparatively small, high surface energy particles into an elevated temperature range at which liquid-phase or activated sintering was rapid relative to coarsening.

Specimens soaked at about 1350° C. in flowing He—H$_2$ (followed by heating to about 2230° C. and soaking) showed a marked increase in density, by extracting the B$_2$O$_3$ coatings through the reaction H$_{2(g)}$+B$_2$O$_{3(l)}$=H$_2$O$_{(g)}$+B$_2$O$_{2(g)}$. Hydrogen needed to be substantially purged from the furnace chamber before continued heating, else its entry into interstitial locations within B$_4$C particles facilitated increased evaporation/condensation coarsening of B$_4$C, and consequently lower final densities. The use of vacuum in lieu of H$_2$ heat treatments at about 1350° C. permitted still more significant gains in final density, whereby the vacuum was effective at substantially extracting B$_2$O$_3$ coatings without stuffing lattice interstitials with hydrogen.

FIG. 4 summarizes the advances, bringing the pressureless sintered B$_4$C density, with commercial-grade powders, up to at least 97.1% of TD.

TABLE 2 provides illustrative examples of embodiments of the present disclosure.

| No. | Green Bbody Diameter (mm) | Uniaxial Pressing Pressure (Mpa) | Cold Isostatic Pressure (Mpa) | Sintering Temperature (° C.) | Sintering Time (Minutes) | Immersed Density (%) | After HIP Immersed Density (%) | Vickers Hardness (kg/mm$^2$) |
|---|---|---|---|---|---|---|---|---|
| 1 | 6.41 | 300 | W/T | 2350 | 60 | 96.2 | 99.4 | 2560 |
| 2 | 6.41 | 300 | W/T | 2350 | 45 | 96.3 | 99.0 | N/A |
| 3 | 15.01 | 300 | W/T | 2350 | 60 | 96.0 | 99.7 | N/A |
| 4 | 44.45 | 250 | W/T | 2320 | 45 | 95.7 | 99.5 | N/A |
| 5 | 44.45 | 10 | 200 | 2320 | 60 | 93.2 | 99.7 | N/A |
| 6 | 44.45 | 10 | 200 | 2320 | 60 | 93.1 | 99.7 | N/A |
| 7 | 44.45 | 10 | 200 | 2350 | 60 | 93.0 | 99.8 | N/A |
| 8 | 44.45 | 10 | 413 | 2320 | 60 | 92.9 | 99.6 | N/A |

It should be emphasized that the above-described embodiments of this disclosure are merely possible examples of implementations, set forth for a clear understanding of the principles of this disclosure. Many variations and modifications may be made to the above-described embodiment(s) without departing substantially from the spirit and principles of this disclosure. All such modifications and variations are intended to be included herein within the scope of this disclosure and protected by the following claims.

The invention claimed is:

1. A component formed by pressureless sintering and then hot isostatic pressing of a green body that is comprised of a powder consisting of boron oxide coated boron carbide particles, a quantity of additional impurities and no sintering additives, said component excluding boron oxide and consisting essentially of sintered boron carbide and said quantity of additional impurities, and said component having a relative density of at least 99%.

2. A component according to claim 1, wherein said component has a Vickers hardness of up to 2400 Kg/mm$^2$.

3. A component according to claim 1, wherein said component is shaped to the contour of a part of a human body.

4. A component according to claim 3, wherein said component is a helmet.

5. A component according to claim 3, wherein said part of said human body is head, or torso, or back, or groin, or arm, or leg, or shoulder, or hip.

6. A component according to claim 3, wherein said contour corresponds to either a male body or a female body.

7. A component according to claim 1, wherein said component has a Vickers hardness of at least 2500 kg/mm$^2$.

8. A component according to claim 1, wherein said component has a relative density of 99%-99.8%, and a fracture toughness of 3.0 to 3.9 MPa·m$^{1/2}$.

9. A component formed by pressureless sintering and then hot isostatic pressing of a green body that is comprised of a powder consisting of boron oxide coated boron carbide particles, a quantity of additional impurities and no sintering additives, said component excluding boron oxide and consisting of a sintered body of boron carbide and said quantity of additional impurities, and having a relative density of at least 99%.

10. A component according to claim 9, wherein said sintered body is shaped to the contour of a part of a human body.

11. A component according to claim 9, wherein said sintered body is a helmet.

12. A component according to claim 10, wherein said part of said human body is head, or torso, or back, or groin, or arm, or leg, or shoulder, or hip.

13. A component according to claim 10, wherein said contour corresponds to either a male body or a female body.

* * * * *